United States Patent [19]

Carberry

[11] Patent Number: 4,494,797
[45] Date of Patent: Jan. 22, 1985

[54] TILT TRAILER

[76] Inventor: Victor V. Carberry, N55 W21404 Logan Dr., Menomonee Falls, Wis. 53051

[21] Appl. No.: 521,691

[22] Filed: Aug. 10, 1983

[51] Int. Cl.³ ............................. B60P 1/28; B60D 1/14
[52] U.S. Cl. ........................................ 298/5; 298/19 R
[58] Field of Search ......................... 298/5, 17 R, 19 R

[56] References Cited

U.S. PATENT DOCUMENTS

| | | | |
|---|---|---|---|
| 1,264,432 | 4/1918 | Palm | 298/19 R |
| 1,635,953 | 7/1927 | Poth | 298/19 R |
| 2,271,071 | 1/1942 | Haber | 298/19 R |
| 3,053,572 | 9/1962 | Harper | 298/5 |
| 4,318,658 | 3/1982 | McIntyre | 298/17 R |
| 4,391,562 | 7/1983 | Hetzner | 298/17 R |

FOREIGN PATENT DOCUMENTS

| | | | |
|---|---|---|---|
| 186130 | 7/1956 | Fed. Rep. of Germany | 298/5 |
| 1003050 | 2/1957 | Fed. Rep. of Germany | 298/17.5 |
| 285514 | 8/1971 | U.S.S.R. | 298/17 R |

*Primary Examiner*—Robert J. Spar
*Assistant Examiner*—Janice Krizek

[57] ABSTRACT

A trailer of the type for use in supporting machines such as snowmobiles, lawn and garden tractors and the like. The trailer includes a frame supported for pivotal movement about the axis of the trailer axle such that the rearward end of the trailer can move toward the ground such that the bed of the trailer is inclined to thereby facilitate loading of a machine onto the trailer. The trailer also includes a draw bar having a forward end including a hitch device adapted to be connected to a vehicle, and the rearward end of the draw bar is pivotably connected to the trailer frame and bed forwardly of the vehicle axle. A lever assembly is also provided for mechanically lifting the forward end of the trailer bed with respect to the draw bar so as to cause the rearward end of the trailer to move downwardly toward the ground to a loading position.

2 Claims, 4 Drawing Figures

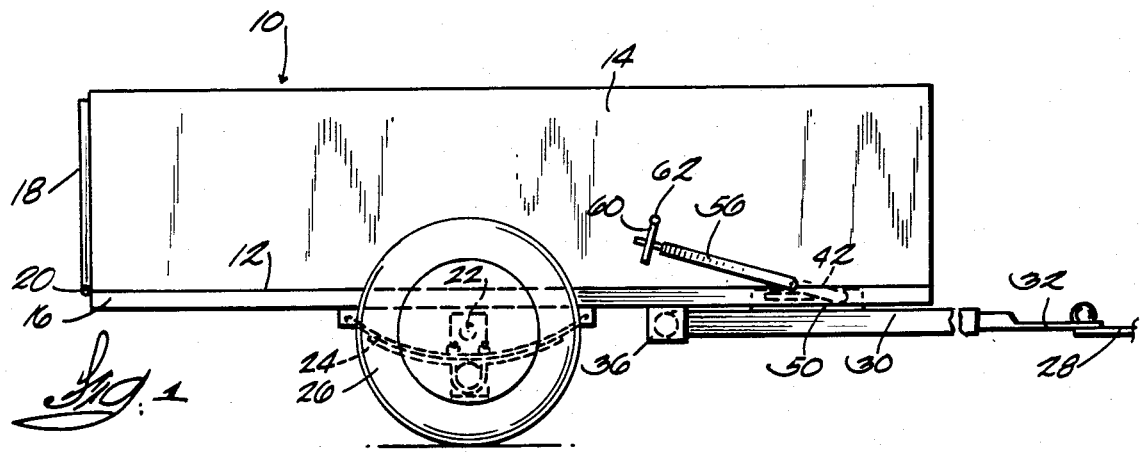
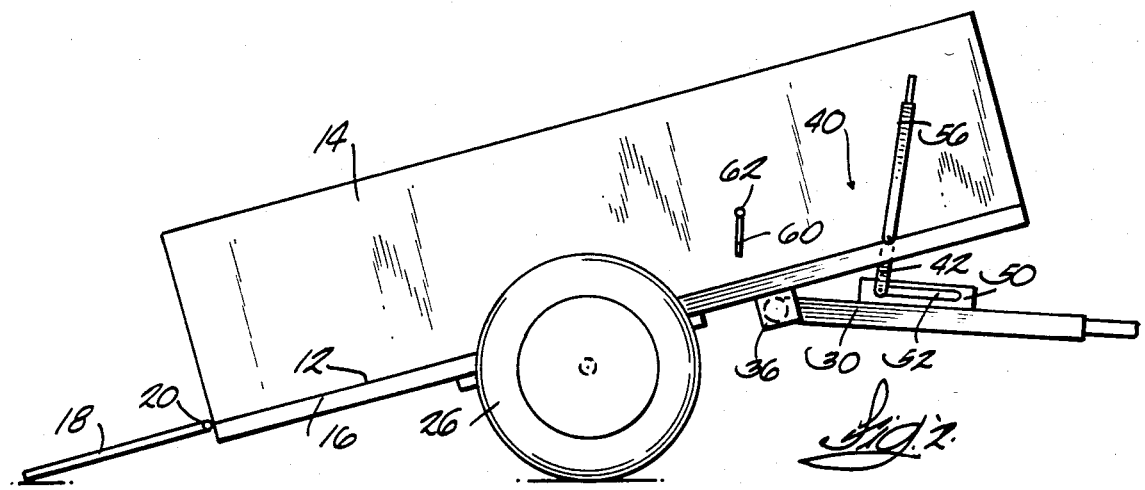
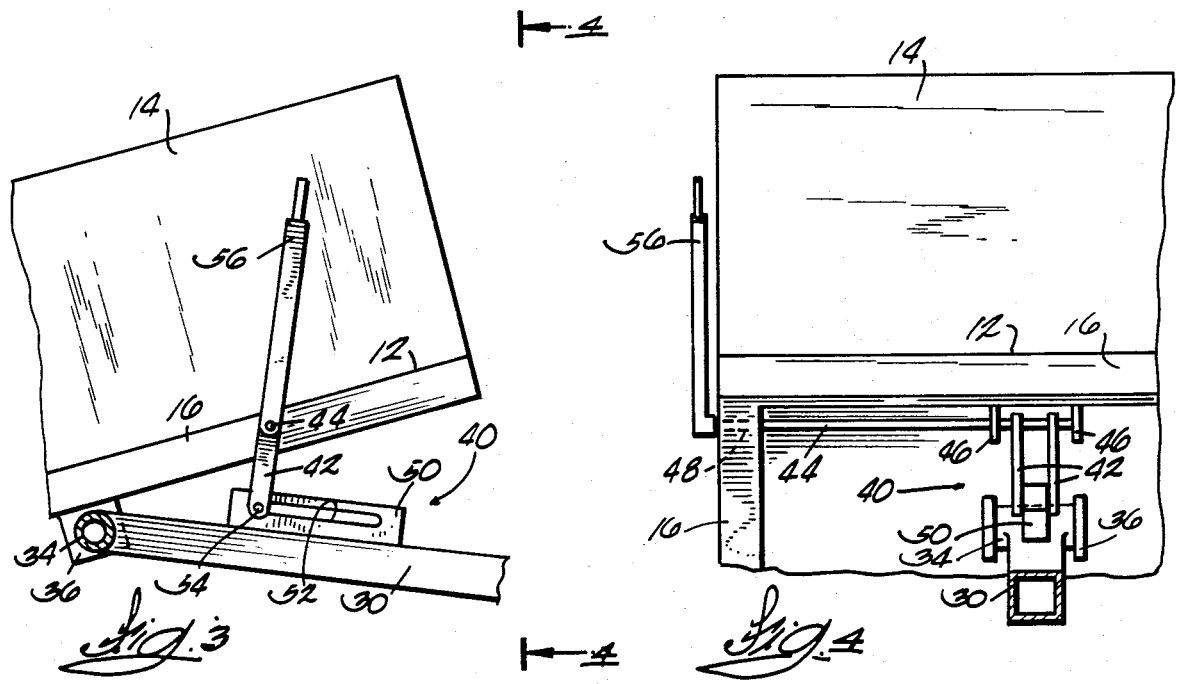

TILT TRAILER

FIELD OF THE INVENTION

The present invention relates to trailers of the type which are adapted to be towed by a vehicle and which are intended to support small machines such as mobile machinery, garden tractors, motorcycles, and snowmobiles. The invention also relates to a trailer construction particularly adapted to facilitate loading of the trailer.

BACKGROUND PRIOR ART

The prior art includes a number of trailers adapted to support small machines such as garden tractors, snowmobiles and the like. Such trailers commonly include a tailgate which is pivoted down to form a ramp. One of the features of prior art trailers of the type intended to carry small machines such as snowmobiles or garden tractors is that with the tailgate positioned to provide a ramp into the trailer or with other ramp means, the ramp and the bed of the trailer form a sharp obtuse angle. With many machines such as garden tractors, lawn mowers, or snowmobiles, it is difficult to get the machine over this angle, either because the mid-section of the machine will hang up on the angle, or as the machine is driven into the trailer, the front end of the machine will fall forward into the trailer. With heavy machines, this can be dangerous to the persons attempting to load the machine into the trailer.

Prior art trailers have also been constructed such that at least portions of the trailer will tilt in order to facilitate loading. In order to permit manual tipping of these trailers, they are normally designed to have the center of gravity of the loaded trailer located immediately above the trailer axle. With the center of gravity located immediately above the axle, the trailer can be manually pivoted relatively easily or with a minimum of effort. On the other hand, when these trailers are pulled behind a vehicle, the trailer will not properly follow the vehicle, in that the trailer tends to sway and is difficult to tow.

SUMMARY OF THE INVENTION

The present invention provides an improved trailer of the type for use in supporting machines such as snowmobiles, lawn and garden tractors and the like.

The trailer embodying the invention includes a frame adapted to support the bed of the trailer, the frame in turn being supported by an axle and a pair of wheels. The frame and the bed of the trailer are supported for pivotal movement about the axis of the trailer axle such that the rearward end of the trailer can move toward the ground such that the bed of the trailer is inclined to thereby facilitate loading of a machine onto the trailer. Means are also provided for connecting the frame and the bed of the trailer to a vehicle. This means includes a draw bar or frame having a forward end including a hitch device adapted to be connected to a vehicle and the rearward end of this draw bar or frame is pivotably connected to the trailer frame and bed forwardly of the vehicle axle. The means for pivotally connecting the bar to the trailer frame permits pivotable movement of the draw bar with respect to the frame about a horizontal axis parallel to the axle of the trailer. Means are also provided for mechanically lifting the forward end of the trailer bed with respect to the draw bar so as to cause the rearward end of the trailer to move downwardly toward the ground to a loading position.

The means for mechanically lifting includes means for holding the bed of the trailer in the raised position during loading of the trailer. The means for mechanically lifting the forward end of the bed of the trailer also includes means for clamping or holding the forward end of the bed down once the trailer is loaded.

In a preferred form of the invention, when the trailer bed is tilted to the loading position, the bed and the trailer tailgate will form a continuous planar surface positioned at a relatively modest incline so as to permit easy loading of machinery or vehicles onto the trailer bed.

By constructing the trailer to include a center of gravity forward of the axle of the trailer, towing of the trailer is improved and substantially better than can be achieved with trailers where the center of gravity is positioned over the trailer axle or rearward of the axle.

In a preferred form of the invention, the means for raising the forward end of the trailer bed includes a lever having opposite ends, the lever being pivotally connected to the bed of the trailer. A lower end of the lever is connected to the tow bar and is joined to the tow bar in such a manner that it can be moved slideably from a first position wherein the lever is generally horizontal and the forward end of the trailer is held down and a second, generally vertical, position wherein the forward end of the trailer is raised.

Various other features and advantages of the invention will be apparent by reference to the following description of a preferred embodiment, from the claims and from the drawings.

BRIEF DESCRIPTION OF THE DRAWINGS

FIG. 1 is a side elevation view of a trailer embodying the present invention.

FIG. 2 is a view similar to FIG. 1 but showing the bed of the trailer in an inclined loading-unloading position.

FIG. 3 is an enlarged partial view of the trailer illustrated in FIGS. 1 and 2.

FIG. 4 is a view taken along line 4—4 in FIG. 3.

Before describing a preferred embodiment of the invention in detail, it is to be understood that the invention is not limited in its application to the details of construction and to the arrangements set forth in the following description or illustrated in the drawings. The invention is capable of further embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a trailer 10 embodying the present invention. In the illustrated construction, the trailer 10 includes a bed 12 having a planar floor and is of a size particularly adapted to support a vehicle such as a garden tractor, mower or snowmobile. While a trailer 10 embodying the invention could be constructed for a variety of other uses and could be constructed in other ways, the trailer 10 is shown as including side walls 14, and the bed is supported by a rigid frame 16. In the illustrated construction, the trailer 10 is also provided with a tailgate 18 having a lower edge joined by a hinge 20 to the rear of the frame 16. The illustrated tailgate 18 is pivotable between a raised or closed position shown in FIG. 1 and a second position shown in FIG. 2 wherein the tailgate functions as a ramp to facilitate loading of vehicles onto the trailer 10.

The frame 16 of the trailer is in turn supported by an axle 22, conventional leaf springs 24, and wheels 26.

The trailer 10 also includes means for joining the trailer to a vehicle hitch 28 such that the trailer can be towed by a vehicle. This means includes a second frame or draw bar 30 having a forward end 32 including a conventional hitch member and adapted to be joined to the trailer hitch 28 of the towing vehicle. Means are also provided for pivotally connecting a rearward end of the draw bar 30 to the frame 12 of the trailer 10 such that the draw bar 30 and the frame 16 are pivotable about a horizontal axis parallel to the axis of rotation of the wheels 26. In the illustrated construction a shaft 34 is fixed to the draw bar and the shaft is pivotally supported by brackets 36 fixed to the frame 16.

In the illustrated construction, the rearward end of the draw bar 30 is joined to the frame 16 at a location forward of the trailer axle 22 and generally intermediate that portion of the trailer frame between the axle 22 and the forward edge of the trailer frame 16.

Means are also provided for lifting the forward end of the trailer frame 16 from a position wherein the bed of the trailer 10 is generally horizontal and the forward edge of the trailer frame rests on or is positioned closely adjacent the draw bar 30 to a second position wherein the trailer bed 12 is tilted to a loading position (FIG. 2). In a preferred form of the invention, the trailer bed 12 will be tilted sufficiently that the bed 12 of the trailer 10 and the tailgate 18 can be co-planar as shown in FIG. 2 to thereby facilitate loading of a machine onto the trailer 10.

The means for causing tilting movement of the bed of the trailer between the horizontal position and the loading position includes a lever assembly 40 best shown in FIGS. 3 and 4.

The lever assembly 40 includes a first lever member 42 pivotably connected to one of the trailer frame and the draw bar. In the illustrated arrangement, the first lever member 42 includes a pair of levers fixed to a shaft 44 and supported for limited pivotal movement about the axis of the shaft 44. The shaft 44 is supported for pivotal movement by a pair of brackets 46 fixed to the frame 16. A free end of the shaft 44 is also shown as extending through a bore 48 in the frame 16 so as to be supported for rotation about the axis of the shaft.

In the illustrated arrangement, the draw bar 30 supports a slide member 50 having a linear groove or slot 52 adapted to support the lower ends of the levers 42 for sliding movement between the position shown in FIG. 1 and the position shown in FIGS. 2 and 3. In the illustrated arrangement, the lower ends of the levers 42 are positioned on opposite sides of the slide member 50 and a rod or pin 54 joins the ends of the spaced-apart levers 42. The rod or pin 54 is housed in a linear slot 52 cut in the slide member 50 and is supported therein for limited linear movement along the length of the slot 52.

A lever 56 is fixed to the free end of the shaft or rod 44 extending laterally through the bore 48 in the trailer frame 16, and the lever 56 provides a means for causing manual rotation of the shaft or rod and consequent movement of the levers 42 between the position shown in FIGS. 1 and 2.

In operation and loading of the trailer 10, the lever 56 is moved from the generally horizontal position shown in FIG. 1 to the vertical position shown in FIG. 2. Such movement of the lever 56 causes pivotal movement of the levers 42 to a generally vertical position wherein the forward end of the trailer bed 12 is lifted such that the trailer bed is inclined. In a preferred form of the invention, the lever assembly 42 and the slide arrangement are constructed such that when the lower ends of the levers 42 are moved rearwardly, they are moved rearwardly past the pivot axis of the levers 42 to an over-center position. Accordingly, the weight of the forward portion of the trailer bed 12 will then tend to restrain the levers 42 in the position shown in FIGS. 2 and 3 and prevent the bed of the trailer from moving back to the horizontal position.

Once the trailer bed 12 is tipped to its inclined or loading position and the tailgate 18 is opened to form a ramp, a vehicle or machine can be driven into the trailer to a position wherein the center of gravity of the machine or vehicle is forward of the axis of rotation of the wheels of the trailer or forward of the trailer axle 22. Since the tailgate 18 and the bed 12 of the trailer form a gradual incline, the vehicle can be easily driven into the trailer and held in place. Additionally, since the bed of the trailer and the tailgate 18 form a planar surface, the vehicle or machine will not be hung up as it moves onto the trailer, and it can be driven onto the trailer at a low speed. When the vehicle or machine has been loaded onto the trailer and properly secured in place, the lever 56 can then be returned to the position shown in FIG. 1 thereby causing the trailer to pivot back to its horizontal towing position.

In a preferred form of the invention, means are also provided for securing the lever 56 in the generally horizontal position shown in FIG. 1 wherein the trailer bed is secured in its horizontal position. In the illustrated construction, the means for securing a lever includes a latch 60 pivotable about a pin 62. When the latch 60 holds the lever in a position shown in FIG. 1, it will be noted that the lever 56 and lever assembly 42 will lock the trailer bed in the horizontal towing position.

Various features of the invention are set forth in the following claims.

I claim:

1. A trailer adapted to be towed by a vehicle and adapted to support a machine, the trailer comprising:
   a trailer bed adapted to support a machine, said trailer bed including a forward portion and a rearward portion,
   a tailgate having an upper edge and a lower edge, said tailgate lower edge being pivotally connected to said rearward portion of said trailer bed for swingable movement between a raised position wherein said tailgate lies in a vertical plane and a lowered position wherein said tailgate and said trailer bed are generally coplanar,
   wheels supporting the trailer bed for movement along the ground, said wheels being located beneath a central portion of said trailer bed, said trailer bed being supported by said wheels for tipping movement between a first position wherein said trailer bed is generally horizontal and a machine loading position wherein said rearward portion of said trailer bed is adjacent the ground,
   means for joining said trailer bed to a vehicle whereby said trailer can be towed by a vehicle, said means for joining said trailer bed to a vehicle including a draw member having opposite ends, a forward end adapted to be hitched to a vehicle and a rearward end, and means for pivotably joining said rearward end of said draw member to said trailer bed forward of said wheels such that said draw member can pivot with respect to said trailer bed about a horizontal axis substantially parallel to the axis of rotation of said wheels, means for shifting said trailer bed from said horizontal position to said loading position, said means for shifting said trailer bed between said horizontal position and said loading position including a first lever having opposite ends, one of said ends of said first lever being pivotably connected to one of said trailer bed and said draw member for pivotal movement about a pivot axis which is fixed relative to said one of said trailer bed and said draw member, and means for slidably connecting the other of said opposite ends of said first lever to the other of said trailer bed and said draw member, said means for slideably connecting supporting said other of said opposite ends for slideably movement in the direction of the longitudinal axis of said draw member, said first lever member being pivotally moveable between a generally horizontal position wherein said trailer bed is in said horizontal position and an over-center position wherein said trailer bed is in said loading position, and a second lever pivotable about the pivot axis of said first lever and fixedly connected to said first lever for pivotal movement with said first lever and for causing pivotal movement of said first lever about said pivot axis, and a shaft connecting said first lever to said second lever, said shaft being rotatable about said pivot axis, said first lever being fixed to a first portion of said shaft to rotate therewith and said second lever being fixed to a second portion of said shaft to rotate therewith, and said means for shifting said trailer bed being positioned forwardly of said means for pivotably joining said rearward end of said draw member to said trailer bed, said tailgate and said trailer bed forming a generally planar inclined surface when said trailer bed is in said loading position and wherein a portion of said tailgate engages the ground and wherein said trailer bed and said tailgate form a planar inclined ramp having a slope whereby the machine can be driven onto the tailgate and trailer bed and up the inclined ramp to said forward portion of said trailer bed.

2. A trailer as set forth in claim 1 wherein said means for slideably connecting includes a slide member including an elongated slot and a pin connected to the other of said opposite ends of said first lever and housed in said elongated slot.

* * * * *